United States Patent
Walker et al.

(10) Patent No.: US 7,063,618 B2
(45) Date of Patent: *Jun. 20, 2006

(54) SYSTEM TO DETERMINE CASINO OFFERS

(75) Inventors: Jay S. Walker, Ridgefield, CT (US); James A. Jorasch, Stamford, CT (US); Geoffrey M. Gelman, Stamford, CT (US); Russell Pratt Sammon, Stamford, CT (US); Magdalena Mik, Greenwich, CT (US); Nandu A. Talwalkar, New Canaan, CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/044,810

(22) Filed: Jan. 27, 2005

(65) Prior Publication Data

US 2005/0137011 A1    Jun. 23, 2005

Related U.S. Application Data

(63) Continuation of application No. 09/570,335, filed on May 15, 2000, now Pat. No. 6,848,995.

(60) Provisional application No. 60/187,269, filed on Mar. 6, 2000.

(51) Int. Cl.
*A63F 13/00* (2006.01)
*A63F 9/24* (2006.01)
*G06F 17/00* (2006.01)
*G06F 19/00* (2006.01)

(52) U.S. Cl. .......... 463/25; 463/16; 235/383; 235/385; 235/424

(58) Field of Classification Search .......... 463/12, 463/13, 16, 20, 17, 25, 23, 26, 42; 700/90, 700/91; 273/143 R, 139, 138.1, 138.2; 235/375–378, 235/383, 385, 424
See application file for complete search history.

(56) References Cited

U.S. PATENT DOCUMENTS

| | | | | |
|---|---|---|---|---|
| 5,007,641 A | * | 4/1991 | Seidman | 463/17 |
| 5,069,453 A | * | 12/1991 | Koza et al. | 463/17 |
| 5,080,364 A | * | 1/1992 | Seidman | 463/17 |
| 5,179,517 A | | 1/1993 | Sarbin et al. | 364/410 |
| 5,231,568 A | * | 7/1993 | Cohen et al. | 463/17 |
| 5,269,521 A | * | 12/1993 | Rossides | 705/14 |
| 5,368,129 A | * | 11/1994 | Von Kohorn | 186/52 |
| 5,417,424 A | * | 5/1995 | Snowden et al. | 463/18 |
| 5,551,692 A | * | 9/1996 | Pettit et al. | 463/16 |
| 5,586,936 A | | 12/1996 | Bennett et al. | 463/25 |
| 5,613,912 A | | 3/1997 | Slater | 463/25 |
| 5,761,647 A | | 6/1998 | Boushy | 705/10 |
| 5,816,918 A | | 10/1998 | Kelly et al. | 463/16 |

(Continued)

FOREIGN PATENT DOCUMENTS

EP    0 961 213 A2    12/1999

OTHER PUBLICATIONS

Troy, Timothy N., "High Stakes Technology (US gross wagers in the hotel-casino industry reached $273 bil in 1993)", Hotel & Motel Management, Sep. 19, 1994, vol. 209, No. 16, p. 27.

(Continued)

*Primary Examiner*—Xuan M. Thai
*Assistant Examiner*—Binh-An D. Nguyen
(74) *Attorney, Agent, or Firm*—Michael D. Downs

(57) ABSTRACT

A system to determine a product to be offered to a casino player based on player data and on an approximate maximum price for which the product may be sold through a retail channel. Advantageously, a potential increase in a casino's profit due to a product offer can be determined using the player data, and an approximate maximum profit attainable through sale of the product through a retail channel can be determined based on the determined price. As a result, a product to offer can be determined in a manner which maximizes casino profit.

20 Claims, 12 Drawing Sheets

U.S. PATENT DOCUMENTS

| | | | | |
|---|---|---|---|---|
| 5,941,772 | A | * | 8/1999 | Paige .......................... 463/20 |
| 5,971,271 | A | | 10/1999 | Wynn et al. ................ 235/380 |
| 5,974,403 | A | | 10/1999 | Takriti et al. ............... 705/412 |
| 6,003,013 | A | | 12/1999 | Boushy et al. ................ 705/10 |
| 6,012,045 | A | | 1/2000 | Barzilai et al. ............... 705/37 |
| 6,015,344 | A | | 1/2000 | Kelly et al. ................... 463/16 |
| 6,110,044 | A | * | 8/2000 | Stern ............................ 463/29 |
| 6,527,638 | B1 | * | 3/2003 | Walker et al. ................ 463/25 |
| 6,848,995 | B1 | * | 2/2005 | Walker et al. ................ 463/25 |

OTHER PUBLICATIONS

Parets-*/, Robyn Taylor, "Comp solutions", International Gaming and Wagering Business, Sep. 1997, Section: p. 73, ISSN: 8750-8222.

Alm, Rick, "Harrah's Unveils Total Gold Players' Card (Harrah's Entertainment Inc. has introduced its 'Total Gold' players' card that dispenses cash back to players)", Kansas City Star, Sep. 9, 1997.

Parets, Robyn Taylor, "Inside job", International Gaming and Wagering Business, Nov. 1997, Section: p. S37, ISSN: 8750-8222.

Smith, Lee-Anne, "Survey—Gambling & Lotteries—Be Smart and Bet on Sun's New Card", Business Times (South Africa), Jul. 11, 1999, Section: Survey, p. 16.

Website: "Casino Comps; Getting Your Share of 'Free Stuff'", (http www vcasino com/comps htm), download date: Feb. 1, 2000.

* cited by examiner

| PLAYER IDENTIFIER 266 | PLAYER NAME 267 | SESSION THEORETICAL WIN 268 | SESSION COIN-IN 269 | YEAR-TO-DATE WIN 270 | HOTEL GUEST? 271 | SHOW TICKETS? 272 |
|---|---|---|---|---|---|---|
| PL-901-902132 | PAUL KING | $70 | $1000 | $220 | NO | YES |
| PL-345-023845 | ADAM CROSSMAN | $14 | $300 | -$100 | YES | NO |
| PL-234-234667 | UNKNOWN | $10 | $250 | -$42 | NO | NO |
| PL-893-902345 | RORY MCKAY | $250 | $4000 | $1,648 | YES | YES |
| PL-460-234552 | EMILY BLACK BOB BLACK | $332 | $5000 | $5,344 | NO | NO |

| PRODUCT IDENTIFIER 276 | PRODUCT DESCRIPTION 277 | PRODUCT INVENTORY 278 | LIST PRICE 279 | CURRENT PRICE 280 | PRODUCT COST 281 | CURRENT VALUE 282 |
|---|---|---|---|---|---|---|
| P-12-23455 | HOTEL ROOM | 9 | $100 | $50 | $20 | $30 |
| P-93-98125 | HOTEL SUITE; FULL COUCH, KING-SIZE BED, HOT TUB | 4 | $250 | $125 | $35 | $90 |
| P-38-90782 | TWO TICKETS TO "JAWS: THE MUSICAL" | 15 | $70 | $10 | $15 | -$5 |
| P-48-34905 | DINNER FOR TWO AT JAKE'S GRILLE & TAP | 6 | $30 | $30 | $20 | $10 |
| P-77-18239 | $40 GIFT CERTIFICATE TO TINA'S RETRO CLOTHES SHOP | UNLIMITED | $40 | $35 | $35 | $0 |
| P-53-23456 | TUXEDO RENTAL FROM ARNOLD TUXEDOS | 0 | $80 | N/A | $15 | N/A |

FIG. 4A

| CURRENT PRICE FORMULA 283 |
|---|
| LIST_PRICE * (3 / NUMBER_OF_RESERVED_ROOMS) |
| 10 * NUMBER_OF_SOLD_OUT_SHOWS |
| LIST_PRICE - NUMBER_OF_UNSOLD_SEATS |
| 10 * NUMBER_HOURS_UNTIL_CLOSING |
| $35 ON WEEKDAYS; $40 ON WEEKENDS |
| N/A |

| PRODUCT IDENTIFIER 276 | CURRENT VALUE 282 | EXPECTED REVENUE FROM OFFER 288 | EXPECTED PROFIT FROM OFFER 289 | DIFFERENCE (PROFIT - VALUE) 290 |
|---|---|---|---|---|
| P-12-23455 | $30 | $100 | $80 | $50 |
| P-93-98125 | $90 | $115 | $80 | -$10 |
| P-38-90782 | -$5 | $25 | $10 | $15 |

286

PL-901-902132 266

| PRODUCT IDENTIFIER 276 | CURRENT VALUE 282 | EXPECTED REVENUE FROM OFFER 288 | EXPECTED PROFIT FROM OFFER 289 | DIFFERENCE (PROFIT - VALUE) 290 |
|---|---|---|---|---|
| P-12-23455 | $30 | $60 | $40 | $10 |
| P-38-90782 | -$5 | $15 | $0 | $5 |
| P-77-18239 | $0 | $50 | $15 | $15 |

| PRODUCT DESCRIPTION 277 | PRODUCT RULE 296 | PRICE RULE 297 |
|---|---|---|
| HOTEL ROOM | INVENTORY OF PRODUCT IS GREATER THAN ZERO, PLAYER'S SESSION COIN-IN IS GREATER THAN $1000, AND PLAYER DOES NOT HAVE A HOTEL ROOM | CURRENT VALUE OF PRODUCT |
| HOTEL SUITE: FULL COUCH, KING-SIZE BED, HOT TUB | INVENTORY OF PRODUCT IS GREATER THAN ZERO, PLAYER DOES NOT HAVE A HOTEL ROOM, PLAYER WANTS TO CASH OUT, AND PLAYER'S TOTAL CREDITS ARE GREATER THAN 2 * PRODUCT COST | PRODUCT COST + $10 |
| HOTEL SUITE: FULL COUCH, KING-SIZE BED, HOT TUB | INVENTORY OF PRODUCT IS GREATER THAN ZERO, PLAYER'S SESSION COIN-IN IS GREATER THAN $3000, PLAYER'S YEAR-TO-DATE WIN IS GREATER THAN $1000, AND PLAYER DOES NOT HAVE A HOTEL ROOM | FREE |
| TWO TICKETS TO "JAWS: THE MUSICAL" | INVENTORY OF PRODUCT IS GREATER THAN ZERO, PLAYER HAS JUST WON A JACKPOT GREATER THAN $200, AND PLAYER DOES NOT HAVE A HOTEL ROOM | FREE |

| PRODUCT DESCRIPTION 277 | PRODUCT RULE 296 | PRICE RULE 297 |
|---|---|---|
| DINNER FOR TWO AT JAKE'S GRILLE & TAP | INVENTORY OF PRODUCT IS GREATER THAN ZERO, CURRENT TIME IS AFTER 2PM AND BEFORE 7PM PLAYER HAS JUST WON A JACKPOT GREATER THAN $100 | [PRODUCT COST - 20% OF SESSION THEORETICAL WIN] + $5 |
| $40 GIFT CERTIFICATE TO TINA'S RETRO CLOTHES SHOP | PLAYER'S SESSION WIN IS GREATER THAN $400 AND LESS THAN $2000 AND PLAYER HAS A HOTEL ROOM | CURRENT VALUE OF PRODUCT - 0.5 * EXPECTED REVENUES FROM OFFER |
| TUXEDO RENTAL FROM ARNOLD TUXEDOS | INVENTORY OF PRODUCT IS GREATER THAN ZERO, PLAYER'S SESSION THEORETICAL WIN IS GREATER THAN $100, CURRENT VALUE OF PRODUCT IS LESS THAN $40, AND PLAYER HAS TICKETS TO SHOW | FREE |
| HOTEL ROOM | INVENTORY OF PRODUCT IS GREATER THAN ZERO, EXPECTED PROFIT FROM OFFER IS GREATER THAN $50, AND PLAYER DOES NOT HAVE A HOTEL ROOM | 0.5 * (LIST PRICE OF PRODUCT + PRODUCT COST) |

| PRODUCT IDENTIFIER 276 | PLAYER IDENTIFIER 266 | OFFER PRICE 306 | TIME OF OFFER 307 | RESULT OF OFFER 308 | RESULTING REVENUES 309 |
|---|---|---|---|---|---|
| P-12-23455 | PL-901-902132 | $50 | 12:30PM 1/5/00 | ACCEPT | $90 |
| P-93-98125 | PL-234-234667 | $45 | 12:45PM 1/5/00 | REJECT | $0 |
| P-38-90782 | PL-234-234667 | FREE | 3:15PM 1/5/00 | ACCEPT | $30 |
| P-48-34905 | PL-345-023845 | $11 | 3:57PM 1/5/00 | ACCEPT | $28 |
| P-77-18239 | PL-893-902345 | $17.50 | 6:02PM 1/5/00 | REJECT | $0 |
| P-53-23456 | PL-893-902345 | FREE | 7:23PM 1/5/00 | ACCEPT | $112 |
| P-12-23455 | PL-460-234552 | $60 | 9:18PM 1/5/00 | REJECT | $20 |
| P-93-98125 | PL-460-234552 | FREE | 6:45AM 1/6/00 | ACCEPT | $18 |

SYSTEM TO DETERMINE CASINO OFFERS

CROSS-REFERENCE TO RELATED APPLICATIONS

This application is a continuation application of U.S. application Ser. No. 09/570,335, filed May 15, 2000; which claims the benefit of U.S. Provisional Application Ser. No. 60/187,269, filed Mar. 6, 2000, for "Revenue-Managed Casino Offers". The contents of each of the above-specified applications are incorporated by reference herein for all purposes.

FIELD OF THE INVENTION

The present invention relates to systems for offering products to casino players. More specifically, the present invention relates to a system for determining a product to offer to a casino player based on various variables relating to the product.

DESCRIPTION OF THE RELATED ART

Casinos employ many systems designed to influence the behavior of casino players. These systems are designed to encourage behavior which is beneficial to the casinos. For example, in order to maximize an amount of time casino players spend actively gaming, casinos provide casino players with well-functioning gaming equipment, bright lighting, and free drinks at game machines and tables.

In order to encourage frequent and high-stakes gaming, casinos offer products to qualifying casino players for reduced prices. These products, are offered to casino players who have met certain qualifying conditions, such as wagering more than a particular amount over a specified period of time, losing more than a particular amount per visit, or the like. For example, a manager of a casino identifies, using casino records, a casino player who loses an average of $5,000 each time he visits the casino. The casino manager then offers the casino player a hotel room and meals usable any time the casino player wishes, for no cost or at a substantially reduced cost. The products are offered under the assumption that maintaining the player as a customer is worth the cost to the casino of the offer. It should be noted that the product offers discussed herein comprise the offering of goods and/or services to casino players for free or for a certain price.

Although the foregoing types of offers were originally reserved for "high-rollers", casinos are now offering products to a wider range of casino players based on their gaming histories. These products are also offered under the assumption that maintaining a casino player as a customer is worth a cost of a particular product offered to the casino player. However, since it is impractical for a casino manager to manage product offers on a large scale, casinos have implemented automated systems for determining and distributing product offers to casino players.

These automated systems are designed so that casino offers are available to all casino players as a "reward" for frequent gaming, high wagers, or other behaviors. According to these systems, such as that described in U.S. Pat. No. 5,761,647 to Boushy, a casino player's gaming sessions are tracked using a tracking card, which is a card having a magnetic strip encoded with player information. In operation, a casino player slides the tracking card into a card reading device of a game machine prior to initiating a gaming session with the game machine. The game machine retrieves the player information encoded on the tracking card, collects gaming information during the gaming session, and transmits the gaming information and the player information to a central database so that the gaming information can be associated with the casino player. At periodic intervals, the database is analyzed to determine whether to offer a product to the casino player, what product to offer, and at what price.

In conventional systems, such as the one described in the article "Getting Your Share Of Free Stuff", ©1997 Casino World Holdings, Ltd., the database analysis proceeds as follows. First, metrics are calculated based on the gaming information associated with a casino player, including an average amount per wager, a total amount wagered per session, an average loss per session, a total loss, a session theoretical win, or other gaming-related data. Next, the metrics are used to determine a product offer. In this regard, the central database stores tables which associate gaming metrics with specific product offers. For example, a database table may associate a discounted hotel room with a $25 to $50 average wager, a free hotel room with a $50 to $100 average wager, a free hotel room and meals with a $100 to $150 average wager, and so on. Therefore, at specified periods, a product is offered to a casino player based on the tables and on gaming information associated with the casino player. Alternatively, a casino player may be presented with the tables and also with metrics corresponding to the casino player's gaming history. In the latter case, the casino player approaches a casino representative to redeem an appropriate product.

Although the conventional automated systems allow determination and management of product offers on a large scale, their static nature precludes easy adaptation to changes in the market for offered products. For example, hotel rooms, show tickets, and the like may be sold for one price during weekdays and four times that price during certain events, such as a championship boxing match, COMDEX, or other popular event. Accordingly, use of static tables often results in a situation in which an increase in a casino's profit resulting from a product offer is less than a profit which could have been realized by the casino by selling the product through conventional retail channels, such as a retail store, an online store, a catalog, a toll-free access number, or the like. As a result, a casino is unable to maximize a difference between an increase in the casino's profit resulting from a product offer and a profit which could have been realized by the casino through a conventional sale of the product.

Moreover, conventional systems do not consider wasted inventory in determining whether to offer a product to a casino player. Using the above example, hotel rooms are only offered to casino players wagering at least $50 on average. This rule does not change, even if a hotel room will be vacant on a particular night. Accordingly, no revenue is generated by the hotel room where revenue may have been generated by offering the hotel room to a casino player averaging less than $50 per wager.

In view of the foregoing, what is needed is an efficient system for determining appropriate products to offer to a casino player in a manner which increases casino profit to a greater extent than conventional systems.

SUMMARY OF THE INVENTION

In consideration of the above needs, Applicants have discovered a system to determine a product to be offered to a casino player based on an approximate maximum price for which the product may be sold through a retail channel. Advantageously, the approximate maximum price can be used to determine an approximate profit which may be realized by selling the product through a retail channel. The approximate profit can be compared to a potential increase in a casino's profit due to offering the product to a casino player, and a product to offer can be thereby determined in a manner which maximizes casino profit with respect to the product.

In one aspect, the present invention relates to identification of a product which may be offered to a casino player based on gaming activity of the casino player, and determination of an approximate maximum price for which the product may be sold through a retail channel.

In another aspect, the present invention concerns reception of player data corresponding to gaming activity of a casino player, determination of an approximate maximum price for which the product may be sold through a retail channel, and determination to offer the product to the casino player based on the player data and on the price.

The present invention also concerns a system to receive player data corresponding to gaming activity of a casino player, to identify a product to offer to the casino player based on the received player data and a first rule, and to determine a price for the product based on a second rule corresponding to the product.

With these and other advantages and features of the invention that will become hereinafter apparent, the nature of the invention may be more clearly understood by reference to the following detailed description of the invention, the appended claims and to the several drawings attached hereto.

BRIEF DESCRIPTION OF THE DRAWINGS

FIG. 3 illustrates a tabular representation of a portion of the player database of FIG. 2;

FIGS. 4A and 4B illustrate a tabular representation of a portion of the product database of FIG. 2;

FIG. 5 illustrates a tabular representation of a portion of the offer determination database of FIG. 2;.

FIGS. 6A and 6B illustrate a tabular representation of a portion of the rules database of FIG. 2;

DETAILED DESCRIPTION

Figure 1:
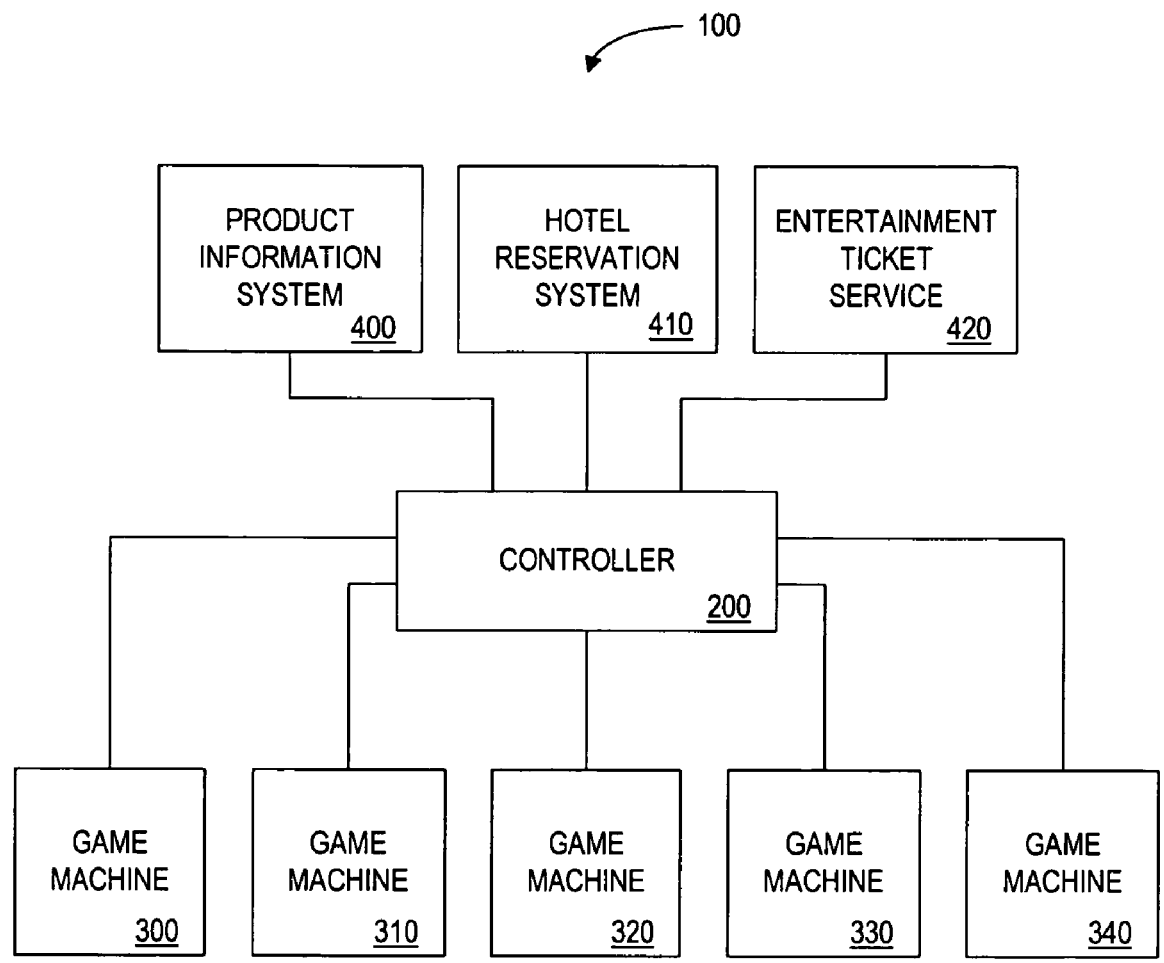
FIG. 1 is a block diagram of a casino system according to one embodiment of the present invention.

To ensure clarity of the following detailed description, set forth below are definitions of terms used herein. The scope of the present invention is not to be deemed limited by the definitions.

Cash out: the act of converting casino credit to cash or tokens. For example, a cash out from a game machine may include receiving cash or tokens based on a number of credits stored in the machine, and a cash out from a casino may include receiving currency in exchange for credits, such as tokens or chips, honored by the casino.

Casino: an entity providing gaming activity to players. As used herein, a casino may be a single entity providing gaming, entertainment, accommodations, and meals, an arcade, a retail store providing game machines, a network proprietor providing game machines at several remote locations, etc.

Casino Player: an individual or group of individuals participating in gaming activity at a casino.

Current Price: an approximate maximum price for which a product may be sold through a retail channel. A current price of a product may be different from a list price of the product, especially if demand for and/or supply of the product has changed since the list price was established.

Current Value: an approximate profit that may be obtained by selling a product through a retail channel. A current value may be obtained by subtracting a cost of a product from a current price of the product.

Game Machine: a machine operated by a casino player for gaming purposes. Examples include slot machines, video poker machines, video blackjack machines, and devices associated with table games such as blackjack, roulette, or craps.

List Price: a price for which a product is offered for sale through a retail channel. In a brick-and-mortar retail environment, a list price may be a price printed on a price tag affixed to a product, a sale price of the product, or another price charged to customers for the product.

Offer Price: a price accompanying a product offer which must be paid by a casino player to receive the offered product. For example, a casino may offer a casino player, based on the casino player's gaming history, a one-night stay in a standard hotel room for a $10 offer price.

Product: any good or service that may be provided to a casino player. Examples include a hotel room, a buffet, a ticket to a show, and a plane ticket.

As a brief description of one embodiment of the invention, a hotel room for the current night is considered, the hotel room being owned by a casino and having a list price of $100. According to the embodiment, it is determined that the hotel room has a current price of $200. In other words, it is determined that an approximate maximum price for which the hotel room may be sold through a retail channel is $200, despite its $100 list price. Such a difference between the list price and the current price may be due to a popular event occurring around the current night, such as COMDEX or a heavyweight championship boxing match.

Based on player gaming data, it is determined that a first casino player will likely lose, if he spends the current night at the hotel, $300 more than he would otherwise lose to the casino. Therefore, it is determined that offering the hotel room to the casino player for free will likely result in $100 more profit for the casino than could be generated by selling the hotel room through a retail channel. Accordingly, if no other casino player is identified who would lose more than $300 as a result of the offer, the hotel room is offered to the first casino player. It should be noted that this brief description is not intended to define the scope of the invention, but rather to quickly familiarize the reader with some of the concepts set forth in more detail below.

System

FIG. 1 is a block diagram of a casino system in accordance with embodiments of the present invention. As shown, the casino system 100 includes a controller 200 in communication with game machines 300 to 340. Although the communication media disposed between each of the game machines 300 to 340 and the controller 200 are represented as hard-wired direct connections, it should be understood that each of the game machines 300 to 340 may be connected to a network, such as a Local Area Network or a Wide Area Network, to which the controller 200 is also connected. Other networks which may be used in accordance with the present invention are a satellite-based network, a cellular network, an RF network, a telephone network, a cable television network, a fiber optic network, or any other network for transferring data between devices. Generally, it should be noted that the controller 200 may be in communication with hundreds or thousands of game machines, and that each game machine may be in communication with the controller 200 using any of the communication media described above.

The controller 200 is operated by a casino and may be a computer server, such as a Sun® Solaris® server, providing a database server and a World Wide Web server. Multiple physical devices may be used to perform the functions of controller 200 according to the present invention, and some or all of these functions may also be performed manually.

Each of the game machines 300 to 340 may comprise a slot machine, a video poker machine, a video blackjack machine, or any other game machine with which a casino player can participate in gaming activity. Each game machine may also comprise a personal computer, such as those based on the Intel® Pentium® processor, a portable computer, a dedicated terminal, an internet kiosk, a personal digital assistant, a pager, a cellular phone, a pay phone, a video game, an automated teller machine, a watch, a vending machine, or any other device capable of providing gaming functionality and of transmitting and receiving data to and from the controller 200. For example, in embodiments where the controller 200 includes a Web server for receiving requests for Web pages, for generating Web pages, and for transmitting Web pages over the World Wide Web, the game machine 300 may be a device capable of transmitting and receiving data over the World Wide Web.

Also in communication with the controller 200 is a product information system 400, a hotel reservation system 410, and an entertainment ticket service 420. The product information system 400, the hotel reservation system 410, and the entertainment ticket service 420 provide product-related data to the controller 200, and may be in communication with the controller 200 via any of the communication media described above with respect to the game machines 300 to 340. As also discussed with respect to the game machines 300 to 340, any number of additional devices may be connected to the controller 200 for providing product-related data to the controller 200 and/or to a casino player.

Those skilled in the art will understand that devices in communication with each other need not be continually transmitting data to each other. To the contrary, such devices need only transmit to each other as necessary, and may actually refrain from exchanging data most of the time. For example, a device in communication with another device via the World Wide Web may not transmit data to the other device for weeks at a time.

Each of the product information system 400, the hotel reservation system 410, and the entertainment ticket service 420 may comprise a personal computer, a database server such as an IBM® AS/400® server, or another system storing data relating to various products which may be offered to a casino player by a casino. As will be described in detail below, the controller 200, according to one embodiment, utilizes received product-related data to determine an approximate maximum price for which the product may be sold through a retail channel. In another embodiment, the controller 200 utilizes product data such as availability of a product or demand for a product to determine a product to offer to casino players.

The product information system 400 may store product information corresponding to retail items such as casino-themed clothing and toys, rental items such as car rentals, travel services such as airplane tickets and limousine rentals, and food-related items such as buffets or the like. The stored information corresponding to each product in the product information system 400 may include a cost of the product, a number of units of the product currently available, a current price for which the product may be sold through a retail channel, a cost of the product, a current value of the product, a formula for deriving a current price of the product, a time by which a product must be sold before perishing (show time in a case of show tickets), or other information.

The hotel reservation system 410 may store data relating to hotel rooms, such as data concerning a current price for which a hotel room may be sold through a retail channel, costs incurred if a hotel room is not sold (marginal costs), demand, occupancy rates, and list prices (or "rack rates"). Similarly, the entertainment ticket service 420 includes data concerning available tickets to shows, such as a number of tickets available, a current price for which a ticket may be sold through a retail channel, costs incurred if a ticket is not sold (marginal costs), current ticket values, available seat locations, ticket list prices, ticket demand, and the like.

Devices

Figure 2:
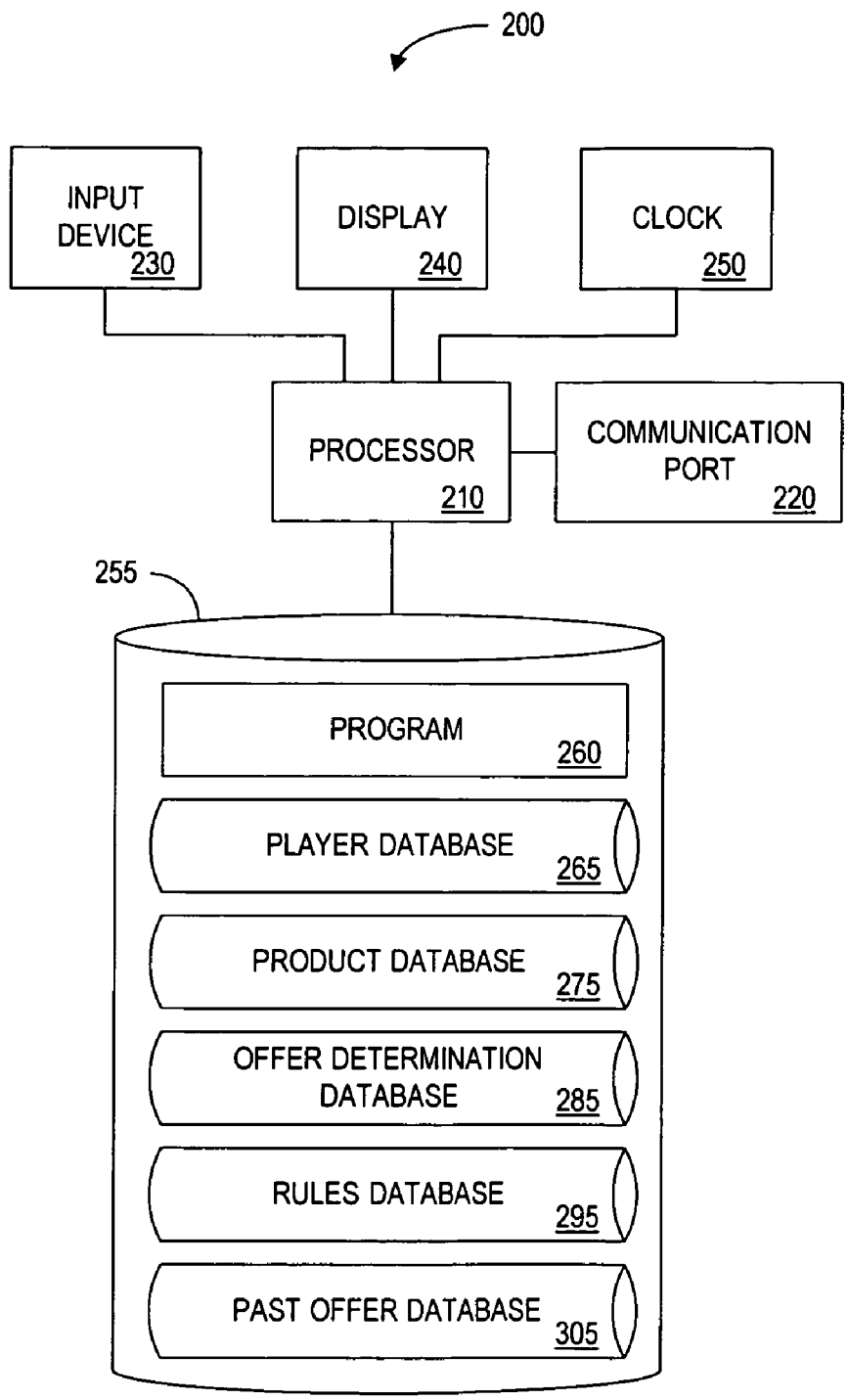
FIG. 2 is a block diagram of a controller according to one embodiment of the present invention.

FIG. 2 is a block diagram of the controller 200 according to one embodiment of the present invention. The controller may be implemented as a conventional network server, a dedicated hardware circuit, an appropriately-programmed general purpose computer, or any other equivalent electronic, mechanical, or electromechanical device.

The controller 200 of FIG. 2 comprises a processor 210, such as one or more RISC® processors. The processor 210 is coupled to a communication port 220 through which the controller 200 communicates with other devices, such as the game machines 300 to 340, the product information system 400, the hotel reservation system 410 and the entertainment ticket service 420. The communication port 220 may include one or more physical ports for physical connection to various types of networks. Accordingly, the communication port 220 may be adapted to communicate using protocols supported by the various types of networks.

Also connected to the processor 210 are an input device 230 and a display 240. The input device 230 may comprise one or more devices for inputting data, such as a keyboard, a touch screen, a mouse, a voice input device, an infrared port, or the like. The input device 230 may be used by a casino manager to enter data for use by the controller 200 in accordance with the present invention. Of course, data may also be input to the controller 200 by a casino manager using a device connected to the controller 200 through the communication port 220. The display 240 is used to display graphics and text to the casino manager, and may provide a user interface for inputting data to the controller 200 or an interface for monitoring processes executing according to the present invention. The display 240 may be a CRT computer monitor, a flat panel display, or another display device. In this regard, data may also be output to the casino manager in hardcopy form via a printer (not shown) connected to the processor 210.

A clock 250 is connected to the processor 210 for controlling execution of process steps by the processor 210. The clock 250 may also be used to associate received data with a reception date and time or to associate transmitted data with a transmission date and time. The processor 210 is also in communication with a data storage device 255. The data storage device 255 is generally a data memory and may include any combination of magnetic, optical and/or semiconductor memory. The data storage device 255 may also include, for example, random access memory (RAM), read only memory (ROM), a compact disc and/or a hard disk. Furthermore, the data storage device 255 and the other elements of FIG. 2 may each be, for example: i) located entirely within a single unit; or ii) connected to each other by a remote communication medium, such as a serial port cable, telephone line, radio frequency transceiver or the like. In one embodiment, the controller 200 comprises one or more computer servers that are connected to a remote server for maintaining databases.

The data storage device 255 stores a program 260 of processor-executable process steps for operation of the controller 200. In the one embodiment, the processor 210 executes the process steps of the program 260 and thereby operates in accordance with the present invention, and particularly in accordance with the methods described in detail herein. The program 260 may be stored in a compressed, uncompiled and/or encrypted format. The process steps of the program 260 can be stored in the data storage device 255 during manufacture of the data storage device 255, can be downloaded to the data storage device 255 from a compact disc or other computer-readable medium, or can be retrieved from a remote or local source over the communication port 220 in the form of a signal having the process steps encoded thereon.

The data storage device 255 also stores processor-executable process steps for basic operation of the controller 200, such as the process steps of an operating system, a database management system, and "device drivers" for allowing the controller 200 to interface with peripheral devices. These latter process steps are known to those skilled in the art, and need not be described in detail herein.

According to one embodiment of the present invention, the steps of the program 260 are transferred from the data storage device 255 into a main memory, such as a RAM, and executed therefrom by the processor 210. In other embodiments, hard-wired circuitry may be used in place of, or in combination with, processor-executable process steps for implementation of the processes of the present invention. Therefore, embodiments of the present invention are not limited to any specific combination of hardware and software. Moreover, process steps performed in accordance with the present invention may be performed wholly or in part by one or more of the controller 200, the game machines 300 to 340, the product information system 400, the hotel reservation system 410, the entertainment ticket service 420, and any other device in communication therewith.

The storage device 255 also stores: i) a player database 265; ii) a product database 275; iii) an offer determination database 285; iv) a rules database 295; and v) a past offer database 305. The databases 265 to 305 are described below and portions thereof are depicted in tabular form in the accompanying figures. As will be understood by those skilled in the art, the schematic illustrations and the accompanying descriptions of the databases presented herein are merely intended to demonstrate operable systems for associating and storing information. Not all of the databases are required for all embodiments of the invention, and a number of other data structures may be employed besides those suggested by the tables shown. Similarly, the illustrated entries of the databases represent sample information only; those skilled in the art will understand that the number and content of the entries can be different from those illustrated.

Databases

Player Database

FIG. 3 illustrates a tabular representation of a portion of the player database 265 according to one embodiment of the present invention. As will be described in detail below, the data in the player database 265 is used in one embodiment of the invention to determine a product to offer to a casino player. The tabular representation includes a number of sample records, with fields associated with each record. Those skilled in the art will understand that the database 265 may include any number of records, and that each record may include fields in addition to those shown in FIG. 3. The fields of FIG. 3 specify: i) a player identifier 266 which uniquely identifies a casino player; ii) a player name 267 of the individual casino player; iii) a session theoretical win 268; iv) a session coin-in 269; v) a year-to-date win 270; vi) hotel guest information 271; and vii) show ticket information 272. In a case that several individuals are playing as a team, the names of the several individuals are listed under the player name 267.

The controller 200 may receive the information stored in the player database 265 from one or a combination of: a casino employee using the input device 230 and the display 240 of the controller 200; surveys filled out by casino players; the product information system 400; the hotel reservation system 410; the entertainment ticket service 420; the game machines 300 to 340; and other sources. For example, the year-to-date win 270 corresponding to a casino player may be based on information received from several game machines used by the casino player during a current year.

The session theoretical win 268 associated with a casino player indicates a theoretical amount of money which should be won by the casino from the casino player during a gaming session. A gaming session is defined, in one embodiment, as a period of time during which a casino player is continuously or semi-continuously gaming. For example, a semi-continuous gaming session may be interrupted by short breaks for a rest, snacks or the like. In other embodiments, a gaming session is defined from the time a player tracking card is inserted into a game machine until a card is ejected therefrom.

The session theoretical win 268 may be calculated using a formula such as "Session Theoretical Win=(Average Session Wager)(Number Of Wagers)(Casino Edge)". In this regard, a casino edge is a percentage of total money wagered by casino players that will be kept by the casino, on average. Many game machines can be programmed to provide a particular casino edge. In Las Vegas, typical casino edges for slot machines range from 2% to 10%.

The session coin-in 269 associated with a casino player indicates an amount of money wagered by the casino player during a current gaming session, and the year-to-date win 270 indicates an amount won or lost by the casino from the casino player during a current year. Of course, although the tabular representation of the database 265 shown in FIG. 3 includes information relating to a session or a year, information stored in the database 265 may also relate to other events or time frames, such as a trip to a casino, a number of trips to one or more casinos, a number of trips to one or more casinos during a predefined number of days prior to a current date, or the like.

Examples of other gaming information which may be stored in the database 265 include alternate currency points earned by a casino player, such as casino credit applicable to product offers, a session win, which is a total amount of money that the casino wins from a casino player during a gaming session, a total length in time of a current session, a paid out jackpot value, or a number of consecutive wins or losses.

Other stored gaming information may include information regarding a casino player's gaming tendencies (e.g. doubling down, taking insurance, drawing to flushes, etc.), identification of other casino players associated with the casino player, information about gaming by the casino player during previous sessions, information about gaming by the casino player which does not occur at the casino (e.g. gaming at other casinos, lottery ticket purchases), and information specifying a frequency with which the casino player participates in gaming activity. Other gaming data which can be tracked and stored is known in the art, as described, for example, in U.S. Pat. Nos. 5,613,912, 5,761,647, and 6,003,014.

The hotel guest field 271 and the show ticket field 272 flag whether or not the casino player is a hotel guest of the casino or has show tickets, respectively. As described below, the hotel guest field 271 and the show ticket field 272 may be used to determine a product to offer to the casino player. In some embodiments, casino players may be offered hotel room or show ticket upgrades. In these embodiments, it is advantageous to include in the player database 265 an indication of the type of hotel room or specific show ticket possessed by the casino player.

The player database 265 may also include information about a casino player unrelated to gaming, including the casino player's general preferences, sporting events in which the casino player is interested, tourist activities in which the casino player is interested, and stores at which the casino player shops.

Product Database

FIGS. 4A and 4B illustrate a tabular representation of a portion of the product database 275. The product database 275 includes data relating to products which may be offered to a casino player in accordance with the present invention. Each product represented in the tabular representation is associated with a record including several fields. The fields specify: i) a product identifier 276; ii) a product description 277; iii) product inventory 278; iv) a list price 279; v) a current price 280; vi) a product cost 281; vii) a current value 282; and viii) a current price formula 283.

The data stored in the database 275 may be received from one or a combination of outside sources such as the product information system 400, the hotel reservation system 410, or the entertainment ticket service 420, may be input to the controller 200 by a casino employee using the input device 230 and the display 240, or may be received from other devices. In this regard, the data may be stored, in whole or in part, in the outside sources as well as or instead of in the data storage device 255. The data may also be generated by the controller 200 based on historical trends or the like.

In one embodiment, the data stored in the product database 275 is updated in real time. For example, when a room is reserved at a casino hotel, the hotel reservation system 410 indicates to the controller 200 that the room has been reserved, and the controller 200 updates the product inventory 278 corresponding to the reserved hotel room. In another example, a hostess at a casino restaurant may use a computer terminal connected to the controller 200 to indicate to the controller 200 that the current price 280 of a lunch buffet is only $5.00, rather than a list price of $10.00, because no one is willing to pay the list price 279.

Generally, the product identifier 276 identifies a particular product which may be offered to a casino player, and the associated product description 277 provides a description of the product. The product inventory 278 indicates how many units of the product remain in the casino's inventory, and thereby reflects availability of the product. Of course, some products cannot be associated with a number of units in inventory (massage, gift certificates), and therefore the product inventory 278 of such products is deemed "UNLIMITED" in the product database 275. As defined above, the list price 281 specifies a price for which the product is sold through conventional retail channels. For example, a person contacting a hotel to determine a price for a hotel room on a particular day is given the list price of the hotel room.

The current price 280 specifies an approximate maximum price for which a product may be sold through a retail channel. In the embodiment illustrated in FIGS. 4A and 4B, the current price 280 is determined using an associated current price formula 283, described below. The current price 280 is, according to one aspect of the invention, any price used to determine an approximate maximum profit which may be realized by selling the associated product through a retail channel. As will be described in detail below, this profit is used in some embodiments to determine whether or not to offer the associated product to a casino player based on the casino player's gaming activity.

"Current", as used in the term "current price" is not meant to imply a temporal requirement. For example, if it is determined that an approximate retail price for which a souvenir glass may be sold through a retail channel will rise from $10 to $20 in one week, the current price 280 of the souvenir glass may be determined to be either $10 or $20.

The current price 280 may be equal to the list price 279, greater than the list price 279 if the casino determines that it may be able to sell the product through a retail channel for greater than the list price 279, or less than the list price 279 if the casino determines that it may not be able to sell the product through a retail channel for the list price 279. The current price 280 may also be less than, equal to, or greater than a market or "spot" price, or a transfer rate, which is a price charged by one unit of an entity, such as a hotel department of a casino resort, to another unit, such as a gaming department of the same casino resort.

The current price 280 may be determined based on availability of the product, demand for the product, a list price of the product, an inventory of the product, historical, current, or forecasted purchasing patterns relating to the product, or various time-dependent factors, such as the day of the week, a number of hours until an event, or the like. For example, a hotel room with a $100 list price 279 may be sold through a conventional retail channel for $200 on the night of a heavyweight championship boxing match, but for only $50 on a Tuesday in April. Accordingly, the current price 280 of the hotel room is $200 in the first instance and $50 in the second instance.

Availability of and/or demand for related products may be considered in determining the current price 280 of a product. For example, if availability of hotel rooms at a casino decreases due to renovations, a current price 280 for a hotel room at a nearby casino may increase. Also, in a case that demand for flights to Las Vegas decreases due to inclement weather, a current price 280 for hotel rooms at a Las Vegas casino may decrease.

In one embodiment, determination of the current price 280 follows revenue management principles. Revenue management principles are known in the art, as described in the book *Revenue Management—Hard Core Tactics For Market Domination*, by Robert G. Cross.

The product cost 281 indicates a cost to the casino of an associated product. In one embodiment, the product cost 281 is a cost which will be incurred by the casino if the associated product is provided, and, in another embodiment, the product cost 281 is a cost which will be incurred by the casino whether or not the product is provided to a casino player. As an example of the latter type of product cost 281, a lunch buffet will cost a casino one amount regardless of how many meals are sold.

The current value 282 of a product is determined by subtracting an associated product cost 281 from an associated current price 280. Accordingly, the current value 282 represents an approximate maximum profit which may be received by a casino by selling the product through a retail channel for the current price 280. It should be noted that the current value 282 may be a negative value in a case that the product cost 281 is greater than the current price 280 for a particular product. The current value 282 may be represented in dollars or in alternate currency points established by the casino and usable to receive product offers.

As stated above, the current price formula 283 associated with a product is used to determine the current price 280 of the product. The current price formula 283, according to one embodiment, incorporates revenue management principles to determine an approximate maximum price for which a product may be sold through a retail channel. The current price formula 283 may take into account any combination of factors, such as the list price 279 of the product, the product cost 281, availability of the product as reflected by metrics such as the product inventory 278, and/or product demand as reflected by metrics such as a number of sold out shows, a number of reserved hotel rooms, a number of unsold seats, and/or a current day of the week. As stated above, a current price 280 of a product may be determined based on demand for a different product. For example, the current price formula 283 associated with a hotel suite 277 is a function of a number of sold-out shows.

It should be noted that the current price formulae 283 shown in FIG. 4B are examples only, and that a current price formula 283 used in conjunction with the present invention may be significantly more complicated, in accordance with known revenue management principles.

Some possible products which may be represented in a database such as the database 275 include clothing, toys, hotel rooms, car rentals, theater tickets, movie tickets, airplane tickets, limousine rentals, taxi rides, free meals and preferred gaming services. While it is possible to offer any type of product to a casino player in accordance with the invention, the casino may offer those products that have low marginal costs or for which a current price 280 is easily determined.

Offer Determination Database

FIG. 5 illustrates a representation of a portion of the offer determination database 285 according to one embodiment of the present invention. The offer determination database 285 is used in one embodiment to select a product to offer to a casino player which maximizes a difference between an increase in the casino's profit due to the product offer and a profit attainable through sale of the product through a retail channel. The illustrated representation includes two tables 286 and 287, each corresponding to a different casino player identified by an associated player identifier 266. Included in each table 286 and 287 are records containing associated fields. The fields specify: i) a product identifier 276 identifying a product from the product database 275; ii) a current value 282 associated with the product in the product database 275; iii) an expected revenue from offer 288; iv) an expected profit from offer 289; and v) a difference 290.

The expected revenue from offer 288 associated with a product specifies an increase in casino revenue which is expected if the product is provided to the associated casino player. The increase is defined as an increase over the revenue which would be received from the casino player if the product was not provided. The increased revenue may include components such as money lost by the casino player during gaming, purchases of products by the casino player, and money lost by other casino players due to recommendations made by the casino player. In this regard, it should be noted that promotion of positive feelings toward a casino due to providing a product may result in increased revenue to the casino.

The expected revenue from offer 288 may be determined based on player gaming data and/or other player information. For example, the expected revenue from offer 288 associated with a hotel room may equal an average session theoretical win multiplied by an average number of sessions per day. In a case that a product is offered to the casino player for a certain monetary amount (the offer is not free), the monetary amount is added to the associated expected revenue from offer 288.

It should be noted that two expected revenues 288 associated with two different product identifiers 276 and a same casino player may not have a linear relationship. In this case, offering both products to the casino player would not be expected to generate revenue equal to the sum of the two expected revenues 290. For example, an expected revenue generated by offering the products associated with product identifiers 276 "P-12-23455" and "P-38-90782" may be $115, rather than $125, the sum of associated expected revenues 288.

The expected profit from offer 289 associated with a product indicates an expected increase in profit received by the casino if the product is provided to the associated casino player. The expected profit from offer 289 may be determined by subtracting the product cost 281 from the expected revenue from offer 288.

Finally, the difference 290 specifies a difference between an expected increase in the casino's profit due to a product offer and an approximate profit attainable through sale of the product through a retail channel. Accordingly, the difference 290 is calculated, in one embodiment, by subtracting the current value 282 associated with the product from the associated expected profit from offer 289. The difference 290 is a positive value if more profit is expected to be generated as a result of providing the product than as a result of selling the product through a retail channel, and the difference is negative if more profit will be generated as a result of selling the product through a retail channel. As described in detail below, use of the difference 290 enables a casino to determine a product to offer to a casino player which maximizes a difference between an increase in the casino's profit due to the product offer and an approximate maximum profit attainable through sale of the product through a retail channel.

Rules Database

FIGS. 6A and 6B illustrate a tabular representation of a portion of the rules database 295 according to one embodiment of the present invention. The tabular representation includes records corresponding to products, with each record specifying: i) a product description 277 as described with respect to FIGS. 4A and 4B; ii) a product rule 296; and iii) a price rule 297. The rules database 295 may include records and fields in addition to those shown. Generally, the information in the rules database 295 is used to determine a product to offer to a casino player and an offer price which the casino player must pay for the offered product.

A product rule 296 is a conditional expression used to determine whether to offer an associated product to a casino player. In the embodiment shown in FIGS. 6A and 6B, a product rule 296 is a Boolean expression which may depend upon a wide variety of variables, such as a current value 282, product inventory (of the associated product or of another product), player gaming data, and player-related data such as whether the casino player has a hotel room, whether the casino player wants to cash out, or whether the casino player enjoys musicals. The player gaming data and player-related data used to evaluate a product rule may come from any of the databases described above or from other sources, such as surveys or the like. If a product rule is evaluated as TRUE, the associated product is selected as a candidate for offering to a casino player. In one embodiment, the product rule 296 associated with a product is designed so that the rule 286 will be TRUE if an increase in a casino's profit due to offering the product will be greater than a profit which would result from selling the product through a retail channel.

The price rule 297 associated with a record includes data for determining an offer price for which to offer an associated product to a casino player. The price rule 297 may be a mathematical function depending on variables relating to casino player gaming data and/or product-related data. For example, the rules database 295 illustrates price rules 297 in which an offer price depends upon no variables (offer price is FREE), a current value 282 of an associated product, a product cost 281, a session theoretical win 268, and a list price 279. Product offers having a free offer price are often referred to as complementaries, or "comps".

The price rule 297 associated with a product may, in some circumstances, result in an offer price greater than a product cost 281. Such an arrangement is advantageous because the casino receives a profit on the product if the offer is accepted and generates a profit as a result of an increase in gaming which results from the offer. A price rule 297 associated with a product may also result in an offer price less than a list price 279 of the product. This arrangement is advantageous because a casino player receiving the offer would perceive that his gaming activity resulted in a product discount, and would thereby be encouraged to increase his gaming activity. In addition, a price rule 297 may result in an offer price for a product which is less than the product cost 279. While the casino risks losing money under such an arrangement, the product may nevertheless be offered under the assumption that the product offer will result in a net profit for the casino due to additional gaming revenues received by the casino (e.g. from increased gaming activity by the casino player) resulting from the offer.

In view of the foregoing, the product rule 286 and the price rule 287 provide a system by which a casino manager can easily manipulate which products are offered to a particular casino player and at what price, depending upon information such as a current value of a product, expected revenues resulting from an offer of the product, availability of the product, and/or demand for the product. The casino manager is thereby able to precisely control product offers with the intent that a difference between an increase in a casino's revenue due to offering the product and a cost to the casino of the product will be maximized.

Past Offer Database

Figure 7:
FIG. 7 illustrates a tabular representation of a portion of the past offer database of FIG. 2.

FIG. 7 shows a tabular representation of a portion of the past offer database 305 according to one embodiment of the present invention. Generally, the past offer database 305 tracks, for each offer previously-made, the product that was offered, the casino player to whom the product was offered, the offer price of the product, the time and date of the offer, and the result of the offer. By tracking offers that have been made to casino players and a result of each offer, the controller 200 can better determine an appropriate product to offer to a casino player in the future. Each record in the past offer database 305 represents a single past offer, and includes: i) a product identifier 276; ii) a player identifier 266; iii) an offer price 306; iv) a time of offer 307; v) a result of offer 308; and vi) resulting revenues 309.

The product identifier 276 identifies a product previously offered to a casino player, and the player identifier 266 identifies the casino player to whom the product was offered. The product identifier 276 and the player identifier 266 can be used to obtain information on the offered product and the casino player from the product database 275 and the player database 265, respectively.

The offer price 306 identifies a price for which the product was offered to the casino player identified by the player identifier 266. In one embodiment, the offer price 306 is calculated using a price rule 297 from the rules database 295. The time of offer 307 indicates the time and date on which the product was offered. The time and date may be determined using the clock 250 of the controller 200, or may be transmitted to the controller 200 at the time the product is offered by a device in communication with the controller 200. The result of offer 308 indicates whether the casino player accepted or rejected the offer.

The resulting revenues 309 associated with an offer are revenues accrued by the casino as a result of the associated offer. The resulting revenues 309 may be used to determine the expected revenue from offer 288 associated with a product and a casino player in the offer determination database 286. Although resulting revenues 309 usually accrue after acceptance of an offer, it should be noted that resulting revenues 309 may also accrue as a result of a rejected offer. Accordingly, it may be advisable for a casino to offer a product which will not be accepted if the past offer database 305 indicates that associated resulting revenues 309 may accrue. In a case that the offer is rejected, the casino incurs no cost due to the offer and the resulting revenues 309 are entirely profit. To determine whether revenues have accrued as a result of an offer rejected by a casino player, the casino may ask the casino player at what time they would have stopped gaming if the offer had not been made. Any revenues accrued after the time can be attributed to the rejected offer.

As stated above, the past offer database 305 can be used to determine a product to offer to a casino player. For example, if the past offer database 305 shows that a particular casino player has accepted three previous offers for a $50.00 hotel room, a system according to the invention may be biased toward offering the same product to the casino player. In another example, if the past offer database 305 shows that 97% of all casino players reject an offer for a 50% discount on tickets to a particular show, the controller 200 may choose not to offer tickets to the particular show. In addition, if a particular casino player always accepts food-related offers and always rejects entertainment-related offers, the controller 200 may determine that food discounts are more highly valued by the casino player than entertainment-related offers. Therefore, in order to provide gaming incentive to the casino player, only food discounts will be offered to the casino player.

In a slightly more complex example, the controller 200 may use information stored in the past offer database 295 to determine that 82% of casino players who are guests of the casino hotel accept an offer for a 50% discount on tickets to a casino show, but only 29% of non-guest casino players accept the offer. Accordingly, the controller 200 can be programmed so as to offer the discounted tickets only to those casino players who are staying at the casino hotel. In this regard, the casino players staying at the casino hotel can be easily identified with reference to the player database 275. Each of the foregoing examples may be implemented by formulating an appropriate product rule 296 incorporating variables related to past offer information.

Processes

I. Determination of Current Price

Figure 8:
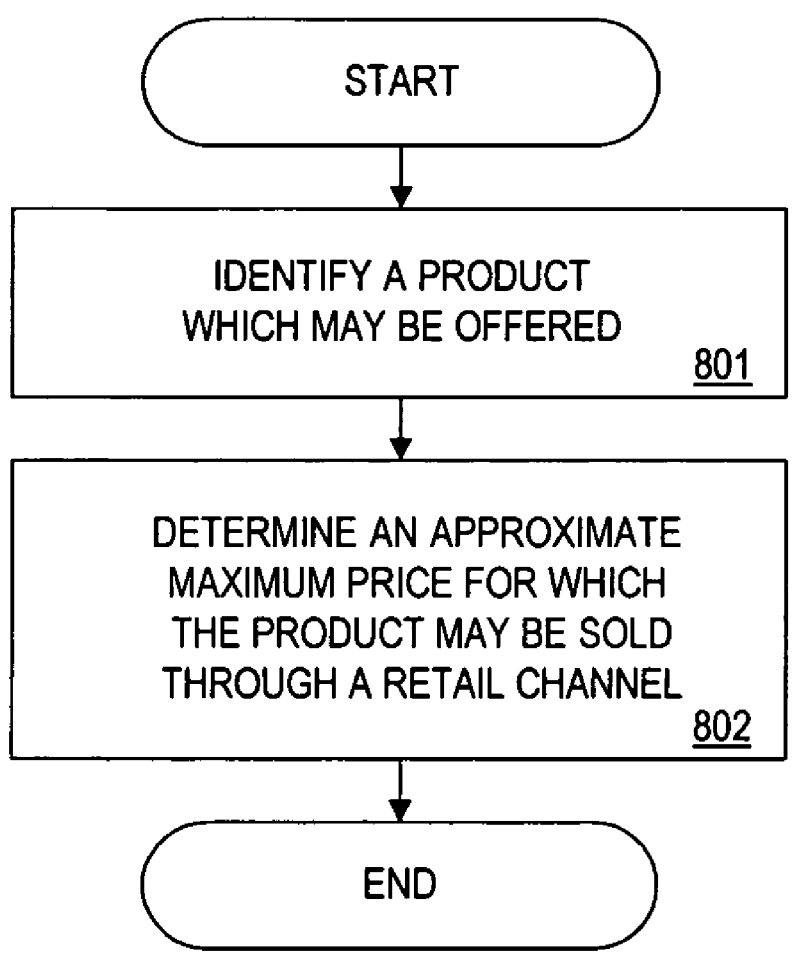
FIG. 8 is a flow chart of process steps to determine a current price of a product according to one embodiment of the present invention.

FIG. 8 is a flow chart of process steps according to one embodiment of the present invention. In a case that the controller 200 performs the process steps of FIG. 8, the process steps may be embodied in hardware within the controller 200, in processor-executable process steps stored on a computer-readable medium such as the data storage device 255 and executed by the processor 210, in processor-executable process steps encoded in an electronic signal received by the controller 200 and executed by the processor 210, or in any combination thereof. It should be noted that the process steps may be executed, wholly or in part, by processors located in several devices, such as one of the game machines 300 through 340, the hotel reservation system 410, and/or any other device in communication therewith.

It should also be noted that each other flow chart of process steps described herein may be similarly embodied. In addition, the particular arrangement of elements in the flow chart of FIG. 8, as well as in the flow charts discussed below, is not meant to imply a necessary order to the steps; embodiments of the present invention can be practiced in many different orders.

Briefly, the FIG. 8 process steps include identification of a product which may be offered to a casino player based on gaming activity of the casino player, and determination of an approximate maximum price for which the product may be sold through a retail channel. As a result, a product to offer can be determined in a manner which maximizes casino profit.

Initiation of the FIG. 8 process steps may be triggered in many ways in accordance with the present invention. For example, the FIG. 8 process steps may be executed periodically so as to continually update a current price 280 associated with each product in the product database 275. Alternatively, the FIG. 8 process steps may be executed each time a casino player wins a prize amount, ends a gaming session, requests a cash out, or checks out of a casino hotel.

The process steps begin at step 801, in which a product which may be offered to a casino player is identified. In one embodiment, the product is identified from among a plurality of products stored in the product database 275. As mentioned above, the product-related data stored in the product database 275 may be input to the controller 200 by a casino employee using the input device 230 and the display 240, or may be retrieved from the product information system 400, the hotel reservation system 410, the entertainment ticket service 420, or another system.

Next, in step 802, an approximate maximum price for which the product may be sold through a retail channel is determined. Such a price may be the current price 280 as defined above. Accordingly, in one embodiment, the approximate maximum price is determined based on demand for and/or availability of the product. In another embodiment, the approximate maximum price is determined in step 802 using a current price formula 283 associated with the product in the product database 275.

Generally, determination of an approximate maximum price for which a product may be sold through a retail channel advantageously assists a casino in determining a product to offer in a manner which maximizes casino profit. For example, a casino may choose not to offer a product having a determined price which is greater than an expected increase in revenue resulting from the offer. Similarly, a casino may choose to offer a product having the largest difference between an expected increase in revenue and an approximate maximum price determined in step 802.

II. Determination of a Product Offer

Figure 9:
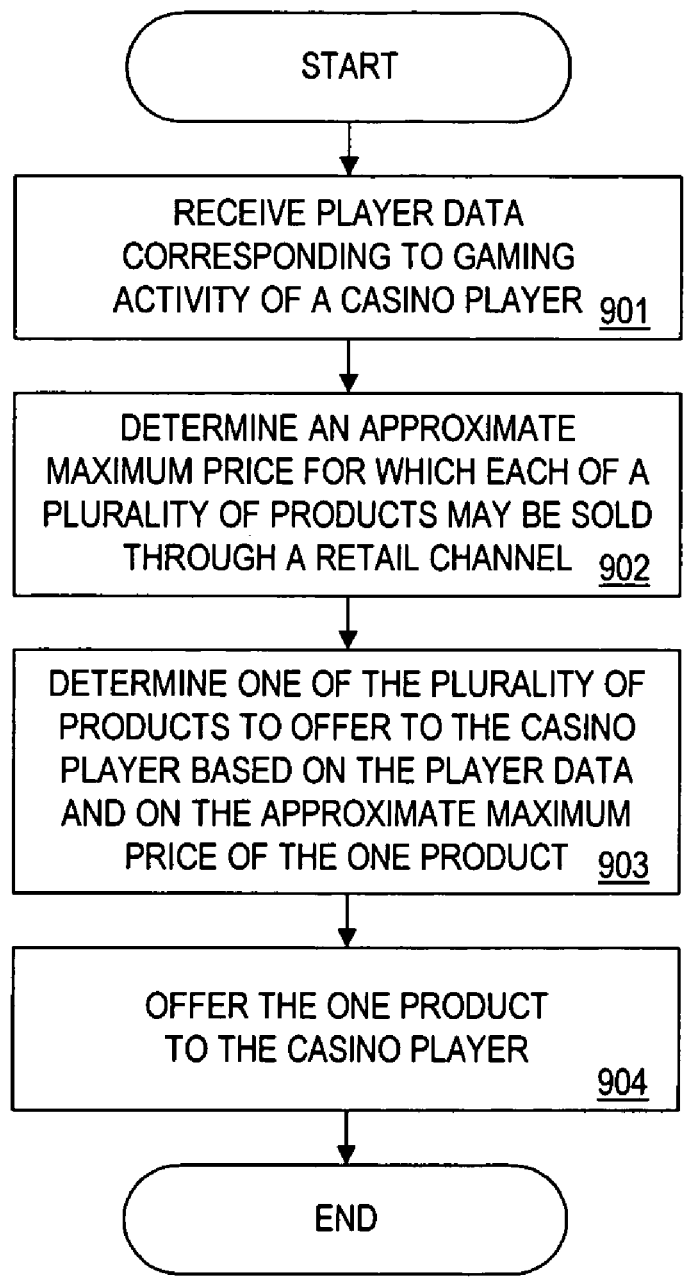
FIG. 9 is a flow chart of process steps to offer a product to a casino player according to one embodiment of the present invention.

FIG. 9 is a flow chart of processor-executable process steps according to one embodiment of the present invention. Briefly, the FIG. 9 process steps include reception of player data corresponding to gaming activity of a casino player, determination of an approximate maximum price for which a product may be sold through a retail channel, and determination to offer the product to the casino player based on the player data and on the approximate maximum price.

Initially, at step 901, player data is received which corresponds to gaming activity of a casino player. It should be noted that the player data may be received in step 901 periodically, after a gaming session, in response to an event, or according to another schedule. For example, the player data may be received in step 901 in real time, in response to a request to cash out, or after detection of a casino player win of a prize amount.

As mentioned above, the player data may be received by the controller 200 from one of the game machines 300 to 340, from a casino employee or the casino player using the input device 230 and the display 240, or from other devices in communication with the controller 200, such as the hotel reservation system 401, a lottery ticket dispensing device or the like. The player data may include many types of data relating to gaming activity of the casino player, and is stored, in one embodiment, in the player database 265 of the controller 200.

Next, in step 902, an approximate maximum price for which a product may be sold through a retail channel is determined for each of a plurality of products. The plurality of products may consist of products pre-selected by a casino manager or otherwise selected by the controller 200. In another embodiment, the plurality of products may be those products for which associated information is stored in the product database 275. An approximate maximum price for a product may be determined in step 902 as described above with respect to step 802. The determined price of each of the plurality of products may then be stored in association with associated product information in the product database 275.

In step 903, it is determined to offer one of the plurality of products to the casino player based on the player data and on the approximate maximum price of the one product determined in step 902. Generally, the determination in step 903 is intended to maximize a difference between an increase in casino profit due to a product offer and an approximate maximum profit which could be realized by selling the product through a retail channel. In this regard, an appropriate table 286 or 287 of the offer determination database 285 may be used in step 903 to select a product having a product identifier 276 associated with a greatest difference 290. In one embodiment, a difference 290 associated with a selected product in the table 286 is compared to a difference 290 associated with the selected product in the table 287 to determine whether to offer the product to the player associated with the table 286 or the table 287.

Of course, at least one expected revenue from offer 288 value and associated expected profit from offer 289 value must be stored in the appropriate table prior to selecting a product in step 903 based on the difference 290. As described with respect to FIG. 5, the expected revenue from offer 288 may be determined based on player data stored in the player database 265 and/or the past offer database 305, and the expected profit from offer 289 may be determined based on the expected revenue from offer 288, the current price 280 (an approximate maximum price for which a product may be sold through a retail channel), and the product cost 281.

Many different factors and methods may be used in the determination of step 903. In one example, it is determined to offer a product having a current value 282 (current price 280 less product cost 281) which is less than a session theoretical win 268 corresponding to the casino player. In a case that more than one product has a current value 282 less than the session theoretical win 268, stored information regarding the casino player's preferences may be considered to determine which of the more than one products would be most preferred by the casino player. It is desirable to offer a most-preferred product because an offer thereof is believed to provide a greatest incentive to the casino player to continue gaming, and thereby results in a greatest increase in casino profit.

In another embodiment, a product associated with a particular number of alternate currency points as a current value 282 is determined to be offered if the casino player has earned an equal or greater number of alternate currency points, and if the earned number of alternate currency points is not equal to or greater than a number of alternate currency points corresponding to a product having a greater current value 282.

After it is determined to offer the one product to the casino player in step 903, the product is offered to the casino player in step 904. The offer may be transmitted from the controller 200 to the game machine 300 to 340 where the casino player is currently located, may be sent to the casino player's home address, may be sent to the casino player by electronic mail, or may be transmitted by telephone. The offer may be presented to the casino player by a casino employee, such as a dealer at a gaming table at which the casino player is currently located. The offer may also be output in step 904 to a beeper, a personal digital assistant, a casino intercom system, a computer, a television, or a casino kiosk used to present offers to casino players.

In a case that the FIG. 9 process steps are triggered by an impending payment to be made to the casino player, the casino player may be offered a choice of taking the entire payment or of accepting the offer in exchange for all or part of the payment due. In this regard, the offer of step 904 may include an offer price to be paid by the casino player. For example, in a case that a casino player wins a prize amount at a game machine, the casino player may be offered a product in exchange for all or part of the prize amount. Also, in a case that a casino player presses the "cash out" button on a game machine, the casino player may be offered the one product in exchange for all or some of the credits stored in the machine. Moreover, a casino player may be offered the one product in step 904 in exchange for all or part of casino credits, such as chips or tokens, brought to a cashier window for exchange into currency.

In one embodiment of step 904, the casino player is presented with the list price of the offered product. For example, the casino player is presented with the offer "Congratulations! Press the "1" button to receive your $50.00 jackpot. Press the "2" button to receive $20.00 and a hotel room on the house (list price $100.00)". Such a presentation is believed to incent increased gaming because the casino player perceives that he is receiving a special deal on a desired product, and because he may continue to gamble on the day following his hotel stay. According to another embodiment, more than one product is determined to be offered to the casino player in step 903 and the offer in step 904 includes a choice of the more than one product.

The offer may also include conditions that must be fulfilled before the one product will be provided to the casino player. For example, the casino player may be required to perform a certain action, such as committing to a certain amount of future gaming, or a specific event must occur, such as a specified sporting event result or the like. Using the former example, a player may be penalized if the commitment to future gaming is not honored within a pre-specified time period.

Of course, the casino player may be presented with several of the alternative types of offers discussed above. For example, after winning a $100.00 prize amount for hitting a jackpot at a game machine 300, the controller 200 may transmit the following offers to a casino player: (i) $100.00 cash; (ii) $50.00 cash and two tickets to a show; or (iii) $10,000.00 cash if the jackpot is hit again within one hour. Such a process is described in commonly-assigned U.S. application Ser. No. 08/769,085, filed Dec. 18, 1996, entitled "Slot Machine Advertising/Sales Method"; which issued as U.S. Pat. No. 6,186,893 on Feb. 13, 2001.

It should be noted that step 904 may be delayed until a particular event occurs. For example, while a casino player is eating dinner, it may be determined that the casino player is to receive an offer for a free hotel room. However, according to this embodiment, the casino player can learn of the offer only if he returns to the casino floor and operates a game machine after finishing dinner. If this policy is known to casino players, the policy may encourage casino players to return to the gaming floor. It is desirable to encourage casino players to return to the gaming floor because further gaming may result.

In another embodiment, a casino player may be permitted to ask for more information about the one product after step 904 and before accepting the offer. For example, in a case that the offer is for two tickets to a show, the casino player may ask and receive additional information such as a time of the show, seat location, plot line, etc. Of course, this information may be included in the offer made in step 904.

III. Rule-Based Determination of a Product Offer

Figure 10:
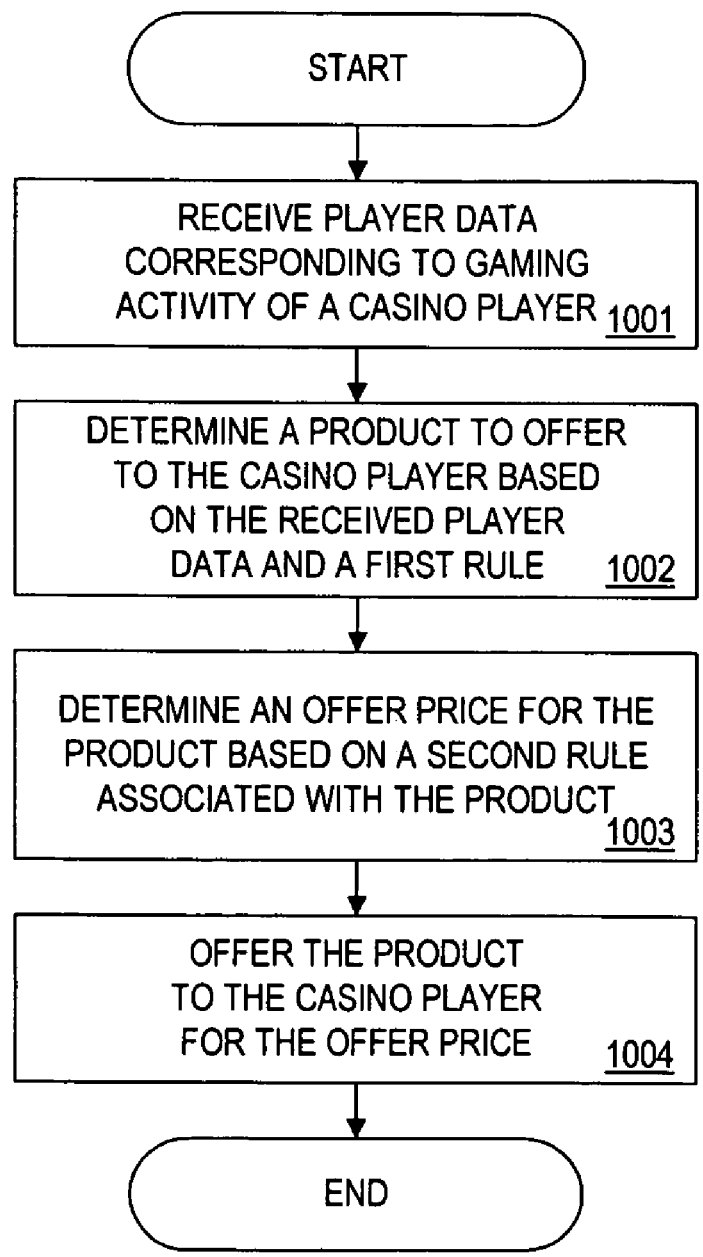
FIG. 10 is a flow chart of process steps to offer a product to a casino player according to another embodiment of the present invention.

FIG. 10 illustrates a flow chart of processor-executable process steps according to an embodiment of the present invention in which the rules database 295 is utilized. Generally, the FIG. 10 process steps include reception of player data corresponding to gaming activity of a casino player, determination of a product to offer to the casino player based on the received player data and a first rule, and determination of an offer price for the product based on a second rule associated with the product.

The FIG. 10 process steps begin at step 1001, in which player data corresponding to gaming activity of a casino player are received. Step 1001 may be executed in response to a particular event, or according to a particular schedule. For example, as described with respect to step 901, the player data may be received in step 1001 in real time, in response to a request to cash out, or after detection of a casino player win.

As also described with respect to step 901, the player data may be received by the controller 200 in step 1001 from one of the game machines 300 to 340, from a casino employee or the casino player using the input device 230 and the display 240, or from other devices in communication with the controller 200. The player data may include many types of data relating to gaming activity of the casino player, and may be stored in the player database 265 of the controller 200.

In step 1002, a product to offer to the casino player is determined based on the received player data and a first rule. In this regard, the rules database 295 of FIGS. 6A and 6B includes a product rule 296 corresponding to each product therein which can be used in step 1002 to determine a product to offer to the casino player. As shown in the tabular representation of FIGS. 6A and 6B, the rule may be a function of received player data, such as an average session coin-in, a total player credit, a year-to-date win, or the like. The product rule 296 may also be a function of player information unrelated to gaming, such as preferences or the like, and information regarding past offers stored in the past offer database 305. Generally, a product rule 296 is evaluated to determine if it is logically TRUE and, if so, a product associated with the rule is determined in step 1002 to be a product to offer to the casino player.

Next, in step 1003, an offer price for the product is determined based on a second rule associated with the product. In the embodiment shown in FIGS. 6A and 6B, the rules database 295 also includes a second rule corresponding to a product. The second rule, a price rule 297, may also be a function of received player data, such as a session coin-in, a total player credit, a year-to-date win, or the like. The price rule 297 may also take into account player preferences, player history, and/or past offers stored in the past offer database 305. In one embodiment, the price rule 297 is an equation which produces a price. Accordingly, appropriate values for each variable specified in a price rule 297 are substituted therein to determine an offer price for the product in step 1003.

Finally, in step 1004, the product is offered to the casino player for the determined offer price. The product may be offered using any of the offering mechanisms and methods described above with respect to step 904.

It should be noted that the process steps of FIG. 10 advantageously allow a casino to exert control over particular products which are offered and offer prices of the products based on changing and dynamic variables. As a result, a casino is able to determine a product to offer to a casino player which maximizes a difference between increased profit resulting from the product offer and a profit which would be realized through sale of the product through a retail channel.

Additional Description

Method #1. A method comprising: identifying a product which may be offered to a casino player based on gaming activity of the casino player; and determining an approximate maximum price for which the product may be sold through a retail channel.

Method #2. A method according to Method #1, wherein the approximate maximum price is determined based on a cost of the product.

Method #3. A method according to Method #1, wherein the approximate maximum price is determined based on a list price of the product.

Method #4. A method according to Method #1, wherein the approximate maximum price is determined based on past offers of the product.

Method #5. A method according to Method #1, wherein the approximate maximum price is determined based on demand for the product.

Method #6. A method according to Method #1, wherein the approximate maximum price is determined based on availability of the product.

Method #7. A method according to Method #1, further comprising: determining a current value of the product based on the approximate maximum price and on a cost of the product.

Method #8. A method according to Method #7, wherein the current value is a number of alternate currency points that must be earned by the casino player in order for the casino player to be offered the product.

Method #9. A method according to Method #8, further comprising determining a number of alternate currency points earned by the casino player based on the gaming activity.

Method #10. A method according to Method #1, wherein the approximate maximum price is different from a list price of the product.

Method #11. A method comprising: receiving player data corresponding to gaming activity of a casino player; determining an approximate maximum price for which a product may be sold through a retail channel; and determining to offer the product to the casino player based on the player data and on the price.

Method #12. A method according to Method #11, wherein the step of determining to offer the product comprises: determining a current value of the product based on the approximate maximum price and on a cost of the product.

Method #13. A method according to Method #11, wherein the step of determining to offer the product further comprises: determining an expected profit based on the player data; determining whether the current value is less than the expected profit; and determining to offer the product to the casino player if the current value is less than the expected profit.

Method #14. A method according to Method #12, wherein the current value is a first number of alternate currency points that must be earned by the casino player in order for the casino player to be offered the product.

Method #15. A method according to Method #14, wherein the player data comprises a second number of alternate currency points earned by the casino player.

Method #16. A method according to Method #15, further comprising offering the product to the casino player if the second number of alternate currency points earned by the casino player is greater than the first number of alternate currency points.

Method #17. A method according to Method #11, further comprising: determining an offer price of the product; and offering the product to the casino player for the offer price.

Method #18. A method according to Method #17, wherein the offering step comprises: transmitting to the casino player a condition which must be satisfied for the casino player to receive the product.

Method #19. A method according to Method #17, wherein the offer price is $0.

Method #20. A method according to Method #11, wherein the approximate maximum price is different from a list price of the product.

Method #21. A method according to Method #11, further comprising: detecting a request from the casino player to convert casino credit to currency; and offering the product to the casino player after the request is detected.

Method #22. A method according to Method #11, further comprising: detecting a request from the casino player to discontinue a gaming session; and offering the product to the casino player after the request is detected.

Method #23. A method according to Method #11, further comprising: detecting a player win of a prize amount; and offering the product to the casino player after the player win is detected.

Method #24. A method according to Method #23, wherein the prize amount is a first amount, and wherein the casino player is offered the product and a second prize amount which is less than the first amount.

Method #25. A method according to Method #11, further comprising: determining if a product should be offered to the casino player based on the player data.

Method #26. A method according to Method #11, wherein the player data comprises data concerning interests of the casino player.

Method #27. A method according to Method #11, wherein the player data comprises data concerning past activity of the casino player.

Method #28. A method according to Method #11, wherein the approximate maximum price is determined based on past offers of the product.

Method #29. A method according to Method #11, wherein the approximate maximum price is determined based on a cost of the product.

Method #30. A method according to Method #11, wherein the approximate maximum price is determined based on a list price of the product.

Method #31. A method according to Method #11, wherein the approximate maximum price is determined based on demand for the product.

Method #32. A method according to Method #11, wherein the approximate maximum price is determined based on availability of the product.

Method #33. A method comprising: receiving player data corresponding to gaming activity of a casino player; and determining to offer a product to the casino player based on the player data and on an approximate maximum price for which the product may be sold through a retail channel.

Method #34. A method comprising: receiving player data corresponding to gaming activity of a casino player; identifying a product to offer to the casino player based on the received player data and a first rule; and determining an offer price for the product based on a second rule corresponding to the product.

Method #35. A method according to Method #34, further comprising offering the product to the casino player for the offer price.

Method #36. A method according to Method #35, further comprising: detecting a request from the casino player to convert casino credit to currency; and offering the product to the casino player after the request is detected.

Method #37. A method according to Method #35, further comprising: detecting a request from the casino player to discontinue a gaming session; and offering the product to the casino player after the request is detected.

Method #38. A method according to Method #35, further comprising: detecting a player win of a prize amount, wherein the product is offered to the casino player after the prize amount is detected.

Method #39. A method according to Method #38, wherein the prize amount is a first amount, and wherein the casino player is offered the product and a second prize amount which is less than the first amount.

Method #40. A method according to Method #34, further comprising: determining if a product should be offered to the casino player based on the player data.

Method #41. A method according to Method #34, wherein the player data comprises data concerning interests of the casino player.

Method #42. A method according to Method #34, wherein the player data comprises data concerning past activity of the casino player.

Method #43. A method according to Method #34, wherein the first rule is based on availability of the product.

Method #44. A method according to Method #34, wherein the second rule is based on availability of the product.

Method #45. A method according to Method #34, wherein the first rule is based on a cost of the product.

Method #46. A method according to Method #34, wherein the second rule is based on a cost of the product.

Method #47. A method according to Method #34, wherein the first rule is based on a current value of the product.

Method #48. A method according to Method #34, wherein the second rule is based on a current value of the product.

Method #49. A method according to Method #34, wherein the offer price is different from a list price of the product.

Method #50. A method for determining a product to offer a casino player, comprising: receiving player data concerning gaming activity of a casino player; receiving product information concerning a plurality of products; for each of the plurality of products, determining a respective approximate maximum price for which a product may be sold through a retail channel; determining a respective cost for each of the plurality of products; determining a current value of each of the plurality of products based on a respective approximate maximum price and a respective cost; based on the player data, determining an expected profit resulting from an offer of each of the plurality of products; and determining to offer one of the plurality of products based on the current value of the one product and the expected profit resulting from an offer of the one product.

Method #51. A method according to Method #50, wherein the step of determining to offer the one of the plurality of products comprises: determining a product of the plurality of products for which an expected profit exceeds a current value by a greater amount than for any other of the plurality of products.

System #1. A system to determine a product to offer to a casino player, comprising:
  a game machine, the game machine comprising:
    a game machine processor, and
    a game machine memory storing processor-executable game machine process steps, wherein the game machine processor is operative with the game machine processor-executable process steps to:
i) obtain a player identifier identifying a casino player;
ii) obtain gaming data corresponding to the casino player; and
iii) transmit the player identifier and the gaming data; and a controller, the controller comprising;
a controller processor, and
a controller memory storing processor-executable controller process steps,
wherein the controller processor is operative with the controller processor-executable process steps to:
i) receive the player identifier and the gaming data;
ii) receive product information concerning a plurality of products;
iii) determine, for each of the plurality of products, a respective approximate maximum price for which a product may be sold through a retail channel;
iv) determine a respective cost of each of the plurality of products;
v) determine a current value of each of the plurality of products based on a respective approximate maximum price and a respective cost;
vi) based on the gaming data, determine an expected profit resulting from an offer of each of the plurality of products; and
vii) determine to offer one of the plurality of products based on the current value of the one product and the expected profit resulting from an offer of the one product.

Medium #1. A computer-readable medium storing computer-executable process steps, the process steps comprising: a step to identify a product which may be offered to a casino player based on gaming activity of the casino player; and a step to determine an approximate maximum price for which the product may be sold through a retail channel.

Medium #2. A computer-readable medium storing computer-executable process steps, the process steps comprising: a step to receive player data corresponding to gaming activity of a casino player; a step to determine an approximate maximum price for which a product may be sold through a retail channel; and a step to determine to offer the product to the casino player based on the player data and on the price.

Medium #3. A computer-readable medium storing computer-executable process steps according to Medium #2, wherein the step to determine to offer the product comprises: a step to determine a current value of the product based on the approximate maximum price and on a cost of the product.

Method #4. A computer-readable medium storing computer-executable process steps according to Method #3, wherein the step to determine to offer the product further comprises: a step to determine an expected profit based on the player data; a step to determine whether the current value is less than the expected profit; and a step to determine to offer the product to the casino player if the current value is less than the expected profit.

Medium #5. A computer-readable medium storing computer-executable process steps, the process steps comprising: a step to receive player data corresponding to gaming activity of a casino player; a step to identify a product to offer to the casino player based on the received player data and a first rule; and a step to determine an offer price for the product based on a second rule corresponding to the product.

Game Machine #1. A game machine comprising:
a memory storing processor-executable process steps; and
a processor,
wherein the processor is operative with the processor-executable process steps stored in the memory to:
1) identify a product which may be offered to a casino player based on gaming activity of the casino player; and
2) determine an approximate maximum price for which the product may be sold through a retail channel.

Game Machine #2. A game machine comprising:
a memory storing processor-executable process steps; and
a processor,
wherein the processor is operative with the processor-executable process steps stored in the memory to:
1) receive player data corresponding to gaming activity of a casino player;
2) determine an approximate maximum price for which a product may be sold through a retail channel; and
3) determine to offer the product to the casino player based on the player data and on the price.

Game Machine #3. A game machine according to Game Machine #2, wherein the processor is further operative with the processor-executable process steps stored in the memory to determine a current value of the product based on the approximate maximum price and on a cost of the product.

Game Machine #4. A game machine according to Game Machine #3, wherein the processor is further operative with the processor-executable process steps stored in the memory to: 1) determine an expected profit based on the player data; 2) determine whether the current value is less than the expected profit; and 3) determine to offer the product to the casino player if the current value is less than the expected profit.

Game Machine #5. A game machine comprising:
a memory storing processor-executable process steps; and
a processor,
wherein the processor is operative with the processor-executable process steps stored in the memory to:
1) receive player data corresponding to gaming activity of a casino player;
2) identify a product to offer to the casino player based on the received player data and a first rule; and
3) determine an offer price for the product based on a second rule corresponding to the product.

Apparatus #1. An apparatus comprising: means for determining a product which may be offered to a casino player based on gaming activity of the casino player; and means for defining an approximate maximum price for which the product may be sold through a retail channel.

Apparatus #2. An apparatus comprising: means for obtaining player data corresponding to gaming activity of a casino player; means for defining an approximate maximum price for which a product may be sold through a retail channel; and means for deciding to offer the product to the casino player based on the player data and on the price.

Apparatus #3. An apparatus according to Apparatus #2, wherein the means for deciding comprises: means for defining a current value of the product based on the approximate maximum price and on a cost of the product.

Apparatus #4. An apparatus according to Apparatus #3, wherein the means for deciding further comprises: means for defining an expected profit based on the player data; means for defining whether the current value is less than the expected profit; and means for deciding to offer the product to the casino player if the current value is less than the expected profit.

Apparatus #5. An apparatus comprising: means for obtaining player data corresponding to gaming activity of a casino player; means for determining a product to offer to the casino player based on the received player data and a first rule; and means for defining an offer price for the product based on a second rule corresponding to the product.

While the present invention has been described above with respect to several embodiments, the scope of the invention is not deemed limited to the above embodiments. Rather, the present invention covers all embodiments falling within the scope and spirit of the following claims as well as equivalent arrangements thereof.

What is claimed is:

1. A method comprising:
   identifying a product that may be offered to a casino player based on gaming activity of the casino player;
   determining an approximate maximum price for which the product may be sold through a retail channel;
   detecting a request from the casino player to convert casino credit to currency; and
   in response to detecting the request, offering the product to the casino player.

2. A method comprising:
   receiving information about a player;
   determining a price for which a product may be sold through a retail channel;
   determining whether to offer the product to the player based on the information about the player and the price;
   detecting a request from the player to convert an amount of casino credit to currency; and
   in response to detecting the request, offering the product to the customer in exchange for at least a portion of the amount of casino credit.

3. The method of claim 2, in which determining the price comprises:
   determining the price based on demand for the product.

4. The method of claim 2, in which determining the price comprises:
   determining the price based on a cost of the product.

5. The method of claim 2, in which determining the price comprises:
   determining the price based on a list price of the product.

6. The method of claim 2, in which determining the price comprises:
   determining the price based on availability of the product.

7. The method of claim 2, in which the information about the player comprises at least one of the following:
   an average amount per wager,
   a total amount wagered per session,
   an average loss per session,
   a total loss,
   a session theoretical win
   a session win,
   a coin-in amount,
   a year-to-date win,
   a duration of a gaming session,
   a jackpot value paid to the player,
   a number of consecutive wins, and
   a number of consecutive losses.

8. A method comprising:
   receiving an indication of a request by a player to convert an amount of gaming credit to currency; and
   in response to detecting the request by the player to convert the amount of gaming credit to currency,
   offering a product to the player.

9. The method of claim 8, further comprising:
   selecting the product based on information about the player.

10. The method of claim 8, further comprising:
    selecting the product based on a price at which the product may be sold through a retail channel.

11. The method of claim 8, further comprising:
    selecting the product based on a profit expected if the product is sold through a retail channel.

12. The method of claim 8, further comprising:
    selecting the product based on a profit expected if the offered product is accepted by the player.

13. The method of claim 8, further comprising:
    determining whether to offer the product to the player.

14. The method of claim 13, in which determining whether to offer the product comprises:
    determining an expected profit were the player to accept the offered product.

15. The method of claim 13, in which determining whether to offer the product comprises:
    determining an expected profit were the product sold through a retail channel.

16. The method of claim 8, in which the product comprises a good.

17. The method of claim 8, in which the product comprises a service.

18. The method of claim 8, in which the product comprises at least one of the following:
    a hotel service,
    an entertainment service,
    a travel service, and
    a gaming service.

19. The method of claim 8, in which the product comprises a meal.

20. The method of claim 8, further comprising:
    receiving an indication that the player accepts the offer for the product.

* * * * *